United States Patent
Cavan et al.

(10) Patent No.: US 9,540,112 B2
(45) Date of Patent: Jan. 10, 2017

(54) DISTRESS BEACON SYSTEM FOR AN AIRCRAFT OR ANOTHER VEHICLE

(71) Applicant: ELTA, Toulouse (FR)

(72) Inventors: Alain Cavan, Toulouse (FR); Thierry Portes, Lavalette (FR); Claude Cresp, Colomiers (FR); Carole Floquet-Picard, Colomiers (FR)

(73) Assignee: ELTA, Toulouse (FR)

( * ) Notice: Subject to any disclaimer, the term of this patent is extended or adjusted under 35 U.S.C. 154(b) by 0 days.

(21) Appl. No.: 14/432,189

(22) PCT Filed: Oct. 1, 2013

(86) PCT No.: PCT/FR2013/052329
§ 371 (c)(1),
(2) Date: Mar. 27, 2015

(87) PCT Pub. No.: WO2014/053762
PCT Pub. Date: Apr. 10, 2014

(65) Prior Publication Data
US 2015/0298813 A1 Oct. 22, 2015

(30) Foreign Application Priority Data
Oct. 2, 2012 (FR) ...................................... 12 59316

(51) Int. Cl.
*B64D 25/00* (2006.01)
*G01S 5/02* (2010.01)
*B64D 45/00* (2006.01)

(52) U.S. Cl.
CPC ............. *B64D 25/00* (2013.01); *G01S 5/0231* (2013.01); *B64D 2045/0065* (2013.01)

(58) Field of Classification Search
CPC ................... G01S 5/0231; B64D 25/00; B64D 2045/0065; B64D 25/20
See application file for complete search history.

(56) References Cited

U.S. PATENT DOCUMENTS 5,852,401 A * 12/1998 Kita ...................... G01S 5/0027
340/521
5,914,675 A * 6/1999 Tognazzini ........... G01S 5/0027
340/426.19

(Continued)

FOREIGN PATENT DOCUMENTS

WO 2011/010942 A1 1/2011

*Primary Examiner* — Hongmin Fan
(74) *Attorney, Agent, or Firm* — Im IP Law; C. Andrew Im

(57) ABSTRACT

A versatile distress beacon system for an aircraft, a ship or other vehicles, including a beacon and a mounting to provide the function of an automatic beacon or a survival beacon. The automatic distress beacon system includes a mounting rigidly attached to the structure of the aircraft and a beacon removably mounted on the mounting. The mounting includes an electronic management unit having a first connector to connect to the data bus and to control the aircraft to receive data from the data bus and orders to activate the beacon, and a second connector to connect to the beacon to transmit data and activation orders to same. The beacon having a memory module to store the transmitted data and a radio transmission module connected to a transmission antenna. The mounting has a detector to detect abnormal events connected to the electronic management unit, with a view to activating the beacon.

19 Claims, 2 Drawing Sheets

(56) References Cited

U.S. PATENT DOCUMENTS

| | | | |
|---|---|---|---|
| 7,916,084 B2 | 3/2011 | Dutruc | |
| 2006/0281435 A1* | 12/2006 | Shearer | G06K 19/0707 455/343.1 |
| 2009/0209227 A1* | 8/2009 | Greer | B63B 49/00 455/404.2 |
| 2009/0224966 A1* | 9/2009 | Boling | G01S 19/17 342/357.31 |
| 2010/0151917 A1* | 6/2010 | Wilson | H04M 1/6075 455/571 |
| 2012/0138741 A1* | 6/2012 | Fabre | G01S 5/0231 244/1 R |
| 2012/0200460 A1 | 8/2012 | Weed et al. | |

* cited by examiner

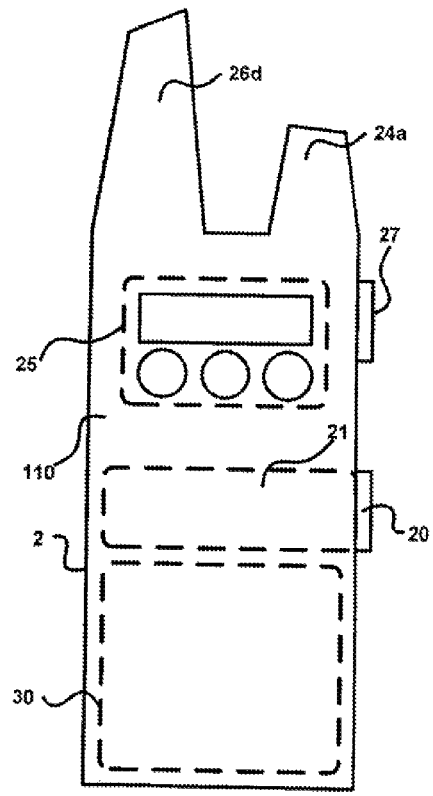
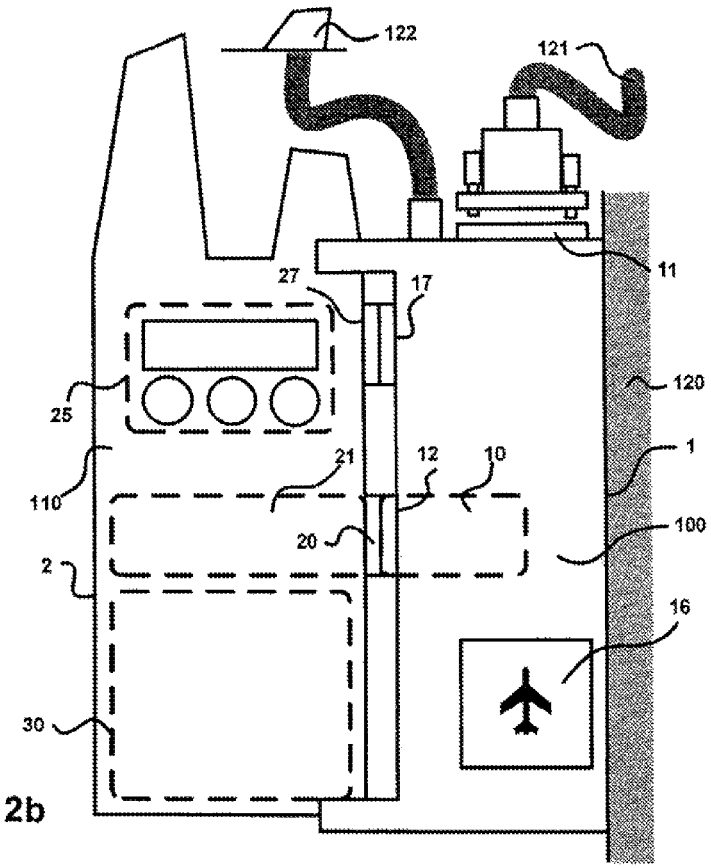
Figure 2a
Figure 2b

DISTRESS BEACON SYSTEM FOR AN AIRCRAFT OR ANOTHER VEHICLE

RELATED APPLICATIONS

This application is a §371 application from PCT/FR2013/052329 filed Oct. 1, 2013, which claims priority from French Patent Application No. 12 59316 filed Oct. 2, 2012, each of which is herein incorporated by reference in its entirety.

TECHNICAL FIELD

The present invention relates to an automatic distress beacon system provided notably to equip aircraft such as, but not limited to, airplane, glider, ultra light motorized, helicopter, rotorcraft, dirigible and other airborne machine. This automatic distress beacon system can also equip any other type of vehicle, for example ships or terrestrial vehicles.

BACKGROUND OF THE INVENTION

Beacons are known from the prior art which are designed to equip airborne machines or other vehicles. These beacons are activated either automatically when an aircraft accident occurs, or manually in a situation considered as critical in order to inform remote rescue means of the identification data and the geographical position of the aircraft in distress.

The national regulations fix the number and the location of the distress beacons which must be carried within each vehicle. Generally speaking, aircraft are equipped with two beacons, namely a beacon referred to as automatic and a portable survival beacon. When they are active, these beacons transmit radio distress signals designed to be received by a constellation of satellites forming for example part of the COSPAS-SARSAT system.

The automatic beacon is a distress beacon integrated into the equipment of the aircraft and connected to an external transmission antenna of the aircraft. It is generally fixed to the primary structure of the aircraft, for example under a false-ceiling. It is equipped with various functional modules, notably for triggering its activation and ensuring its identification. The electronic modules are enclosed within its housing, whereas an integrated impact detector is mounted onto the latter. It can be activated by remote control by a voluntary action of the pilot from the cockpit, or else it is triggered automatically in the case of a violent impact by means of the integrated impact detector.

The survival beacon is on the other hand removable. It is usually kept in the aircraft main cabin and is readily accessible to the members of the crew. It is designed to be taken away and/or actuated in the case of a situation considered to be critical by the members of the crew, or even by survivors in the case of an accident. It is equipped with functional modules enclosed within its housing for triggering its activation, ensuring its identification and its localization. It may also be triggered by a sensor sensitive to the presence of water.

OBJECT AND SUMMARY OF THE INVENTION

Technical Problem

The installation and the maintenance of several types of beacons on aircraft entail drawbacks in several respects. One drawback is that the operator is obliged to manage several references, which increases the time needed and the complexity of the management, notably during maintenance and storage operations. The availability of parts during the manufacture of the beacons, or of spare parts for maintenance, requires means that are more significant the more there exist types of beacons. The training of the personnel is also more onerous. The presence of various types of beacons within an aircraft is therefore a source of increased costs of use.

Another drawback comes from the constraints inherent in the installation of the beacons and in their maintenance under operational conditions which requires regular access to the beacon and its removal for inspection and/or updating of the setup. These operations involve an intervention on its electrical connection to the avionics system and to the antennas, on which relies the entire interface with the aircraft (cabling and power supply, for example). Furthermore, these operations are repeated at regular intervals of time for the obligatory safety verifications. There is a finite risk of an incorrect re-connection with the avionics system of the aircraft and with other equipment, for example the external antenna, after the inspection, or of a deterioration of the connection member. This risk needs to be totally eliminated or at the very least greatly reduced.

Another problem comes from the fact that each beacon must be identifiable and must also allow the aircraft from which it originates to be identified, even if it is far away from it (whether it is an automatic beacon or a survival beacon). Currently, a setup procedure is carried out for each beacon at the factory or in a workshop and must be re-done when the aircraft changes operator (or other data are to be inserted into the beacon), leading to a loss of time and a new risk for the reliability of the connection to the avionics system of the aircraft and to other equipment such as antennas.

Technical Solution

The aim of the present invention is to provide a solution to the aforementioned problems by providing a means allowing a survival beacon to be transformed, in a reversible manner, into an automatic distress beacon. For this purpose, the inventors have designed a model of beacon and an associated base unit which cooperate in order to provide the automatic beacon function or that of a survival beacon, depending on the situation. The base unit is designed to be fixed to the structure of the aircraft, whereas the beacon will be releasably mounted on the base unit so as to form an automatic beacon system. The automatic beacon system according to the invention may thus be generically qualified as a "distress beacon". The beacon associated with its base unit will be denoted as an "automatic distress beacon system".

Thus, the operator now only has to manage one model of beacon, which addresses the problem areas of the storage, of the maintenance and of the availability of parts, and also simplifies the training of the personnel concerned.

The automatic distress beacon system according to the invention therefore comprises a removable beacon and a fixed base unit, the removable beacon in combination with the base unit providing all the functions of an automatic beacon when it is placed on said base unit, and all the functions of a survival beacon when it is separated from the base unit. This versatility is obtained by virtue of a special base unit in which all the main functions of the automatic system and other equipment are localized, a fact which allows the whole interface with the aircraft, such as the cabling and power supply for example, to be centralized here.

Since the main functions are transferred onto the base unit, the installation of the system and the maintenance under operational conditions are facilitated. Once the base unit has been fixed onto the primary structure of the aircraft, the operator can install and withdraw the removable beacon with a single action, simply and without tools, as often as necessary. He or she does not have to dismantle the base unit fixed to the aircraft. The connectors providing the interface with the avionics system of the aircraft and other equipment remain connected, which substantially reduces the problems of deterioration or of a bad connection.

Thus, the subject of the present invention is an automatic distress beacon system designed to equip an aircraft, a ship and other vehicles, said system comprising:
- a base unit designed to be rigidly fixed to the structure of the aircraft, and
- a beacon designed to be releasably mounted on this base unit, which base unit comprises an electronic management unit having a first means of connection to the data and control bus of the aircraft for receiving data from this bus, together with commands for activation of the beacon, and a second means of connection to the beacon for transmitting to it data and activation commands, said beacon being equipped with at least one memory module for storing the transmitted data and one radio transmission module designed to be connected via the base unit to an external transmission antenna of the aircraft.

Owing to this disposition, the removable beacon and its associated base unit form an automatic distress beacon system, the beacon in combination with the base unit providing the function of an automatic distress beacon when it is installed on the base unit. Nevertheless, it is designed to act as a survival beacon, and to play this role in the case of an incident, if it is not placed on the base unit which is the subject of the invention. When it is installed in the base unit, the beacon is connected to the electronic management unit which the base unit comprises and, in the opposite case, it constitutes an autonomous survival beacon.

In addition, in the case of a failure of the beacon, a ready and quick replacement by a compatible survival beacon now becomes possible, and where the aircraft flight can only be authorized if it is equipped with an automatic beacon, the possibility of a quick replacement avoids delays on the ground which are in themselves costly.

According to another feature of the invention, the base unit additionally comprises at least one means for detecting abnormal events which is connected to the electronic management unit with a view to the activation of said beacon.

Thus, in a manner which is original, the base unit centralizes all the functions normally present on an automatic beacon, notably the elements for connection to the electrical power supply and to the corresponding buses of the aircraft.

The base unit therefore comprises at least one means for detecting abnormal events, generally at least one impact detector. In a complementary manner, the base unit contains an electronic management unit allowing the management of the detection of abnormal events with a view to the activation of the automatic beacon system if an abnormal event is detected. The electronic management unit is equipped with a first means of connection to the data and control bus of the aircraft for receiving data from this bus, together with commands for activation of the removable beacon, and a second means of connection to the removable beacon for transmitting to it data and activation commands.

The beacon is itself equipped, notably, with a memory module for storing the data transmitted to it from the data bus of the aircraft via the base unit. It also comprises a radio transmission module designed to be connected via the base unit to an external transmission antenna of the aircraft, for the transmission of the distress information to satellites. In the case of a fault in the connection to the external antenna of the aircraft, an internal antenna of the beacon automatically takes over in order to ensure the transmission of said distress information.

The connection of the removable beacon to the base unit allows important data relating to the flight and to the operation of the equipment of the aircraft to be transferred to the memory of this beacon, together with data relating to the geographical position of the aircraft. This data is stored in the memory module and allows an activation of the beacon. Said activation allows a distress signal to be generated which is then transmitted to the constellation of satellites. This distress signal notably comprises the geographical coordinates of the aircraft at the moment when it is transmitted. The alert is thus given when the aircraft is involved in an accident or an incident sufficiently serious to have caused its evacuation. It is to be noted that, thanks to the present invention, it is also possible to generate an alert when an aircraft is in a critical situation, for example in the period of time preceding an accident.

The geographical coordinates of the position of the aircraft are delivered via the data bus of the aircraft or else, alternatively, via the automatic beacon system, the aircraft and the beacon system each being equipped with a geolocation system, for example of the GPS type (acronym for Global Positioning System). Preferably, the global positioning system is integrated into the beacon. As a variant, a global positioning system is also integrated into the base unit.

According to a preferred feature of the beacon system according to the invention, the electronic management unit comprised in the base unit comprises an activation module, a data communications module and an electrical power supply module. This module will advantageously conform to the standards relating to the buses and electrical supply systems internal to aircraft and the protocols used in aeronautics. It will preferably conform to the standard well known by the name ARINC 429 protocol defined by the AEEC (Airlines Electronic Engineering Committee).

Advantageously, in the beacon system according to the invention, the or each means for detecting abnormal events equipping the base unit comprises an impact detector, this detector being connected to the activation module of the electronic management unit that the base unit comprises.

According to one preferred embodiment of the beacon system according to the invention, the impact detector is an orientable accelero-contact sensor. This type of detector is known in the field in question, such that those skilled in the art will be able to choose the most suitable model.

According to another feature of the beacon system according to the invention, the base unit contains an electroacoustic transducer connected to the activation module. This device allows the beacon system to be located when it is in an environment opaque to radio frequencies, in order to detect it even under water.

According to yet another particularly advantageous feature of the invention, the beacon comprises a means of identification specific to it and the base unit comprises a means of identification specific to it. Each part of the automatic beacon system can therefore be identified separately, whether these parts are associated or far away from each other. The means of identification are for example RFID (acronym for Radio-Frequency IDentification) chips. The means of identification of the beacon and of the base unit carry an identifier code or identification data, where the identifier may be identical or different, but in any case being known and listed.

Additionally, according to another feature of the invention, the beacon furthermore comprises an identification module, which enables the means of identification of the beacon to be read wirelessly and, as a first priority when the latter is installed on the base unit, the reading of the means of identification of this base unit.

This module is advantageously a RFID module, designed for contactless reading of the means of identification such as RFID chips. It may be inserted near to the chip equipping the beacon and can allow the contactless reading of the RFID chip of the beacon. When this beacon is installed on the base unit, it can also carry out the reading of the RFID chip of the latter. In the latter case, the identification data written into the RFID chip of the base unit, which are read as a first priority by the RFID module of the beacon, are considered as the identification data of a usual automatic beacon. Since this identification data is carried by the base unit, it will be readable without any tool by the RFID module of another beacon (following a replacement for example). No new setup of the data of the beacon is required on board the aircraft, which greatly simplifies the maintenance.

According to another feature of the invention, the base unit is supplied with electrical power by an external source of electrical power which may be one of the power sources of the aircraft.

Alternatively, according to another feature of the invention, the base unit has a source of electrical power integrated into it in the form of batteries.

According to another feature of the invention, the base unit is equipped with a water pressure detector, electrically connected to the electronic management unit, with a view to transmitting a distress signal if a pressure of water is detected (immersion).

According to another feature of the invention, the base unit incorporates an electro-acoustic transducer of the type of those known by the name "pinger". This electro-acoustic transducer is powered by the electrical power source of the beacon or potentially by the electrical power source of the base unit, if such a power source is present within the base unit. This electro-acoustic transducer will be activated by the electronic management unit that the base unit comprises.

According to another feature of the invention, the beacon is equipped with means for manually triggering a distress signal.

Thus, after having been extracted from its base unit, the beacon is usable as a portable survival beacon.

The invention thus comprises a single beacon system which facilitates the management of the references for the user, and which allows time to be gained in maintenance, the exchange of beacon being very quick. The installation is easy in the respect that the connections are made solely on the base unit. Furthermore, the overall mass is very small and the volume occupied is reduced, the beacon and base unit assembly being very flat and readily placed within the aircraft.

BRIEF DESCRIPTION OF THE DRAWINGS

Other advantages, aims and features of the invention will become apparent upon reading the description of one preferred embodiment, presented by way of non-limiting example with reference to the appended drawings in which:

FIGS. 2a and 2b are schematic views of a survival beacon alone (FIG. 2a) and of the same beacon placed on a base unit (FIG. 2b), forming an automatic distress beacon system according to the invention, as it appears to the users.

DETAILED DESCRIPTION OF THE EMBODIMENTS

Figure 1:
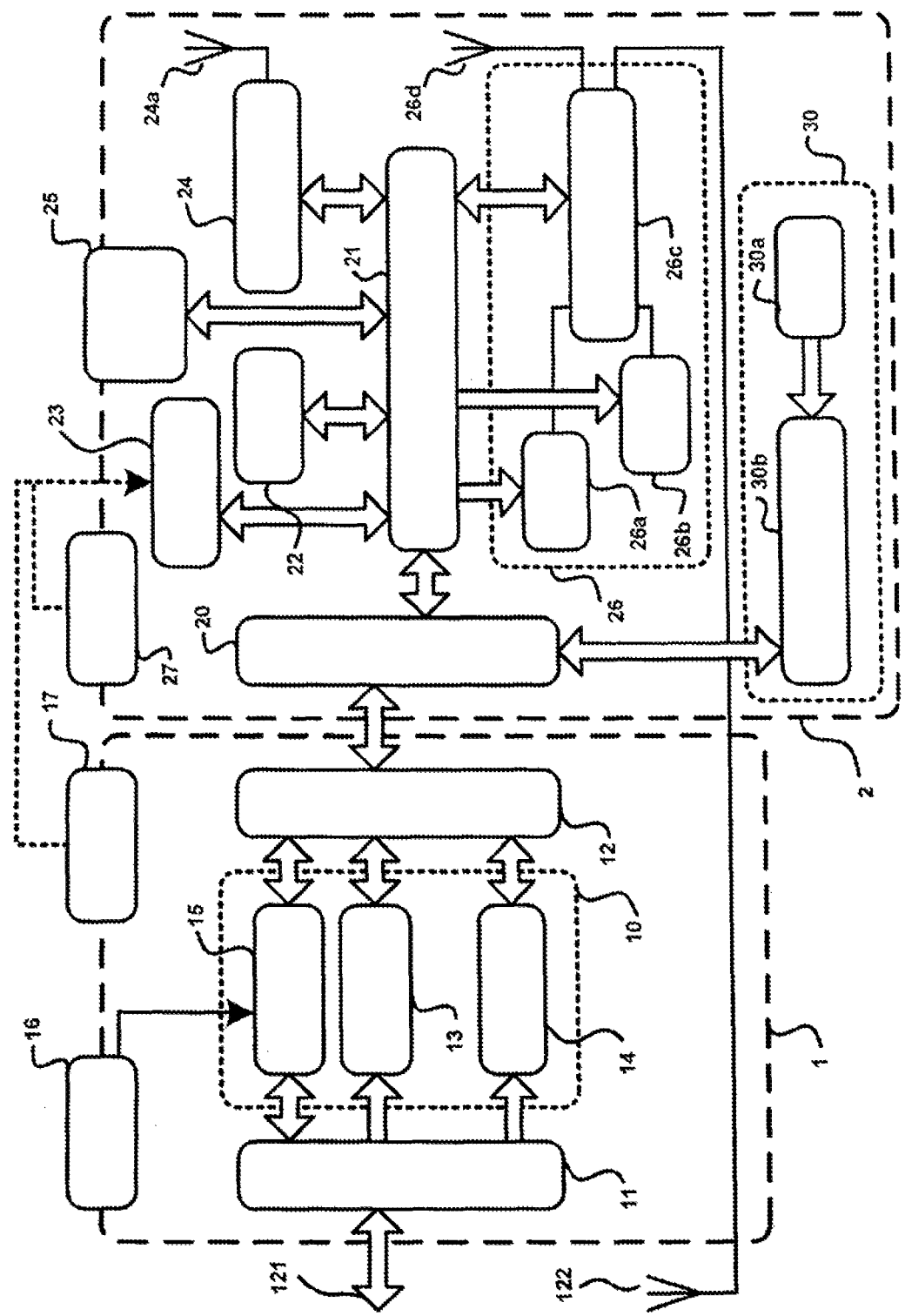
FIG. 1 is a schematic functional diagram of the automatic distress beacon system according to the invention.

As shown, the automatic distress beacon system according to the invention is designed to equip a vehicle which may be, but is not limited to, an aircraft. It comprises a base unit 1 designed to be fixed to the structure 120 of the aircraft and a beacon 2 designed to be engaged in a removable manner into the base unit 1 and thus to perform, in combination with this base unit 1, the functions of an automatic distress beacon. Detached from the base unit 1, the beacon 2 acts as a survival beacon.

The base unit 1 comprises a protective housing 100, having an open accommodation for receiving the beacon 2.

The base unit 1 is equipped with an electronic management unit 10 connected by a connection means to the data and control bus 121 of the aircraft. This connection means advantageously consists of an interface module 11 also providing suitable protection against lightning, interference associated with mobile telephones or other devices, and provides the physical interface with the bus 121 and, more generally, with the avionics system of the aircraft and other equipment, for example antennas, in order to access certain data. It has also been designed for protecting the beacon system from all the electrical interference induced by the environment of the automatic beacon system, when it is in the aircraft. It complies with the standards in force notably relating to levels of protection.

When the beacon 2 is installed in the base unit 1, the electronic management unit 10 is also connected, via a second means of connection 12 of the base unit 1, to a means of connection 20 that the beacon 2 comprises. These two means of connection 12 and 20 each consist of an interface module providing suitable protection.

The electronic management unit 10 comprises a data communications module 13 of the ARINC 429 type providing the interface with the data bus 121. It also comprises an electrical power supply module 14 and an activation module 15. The aforementioned modules of the electronic management unit 10 are connected to the interface modules 11 and 12, providing the communications between the base unit 1 and, respectively, the avionics system of the aircraft and other equipment such as antennas and the beacon 2.

An impact detector 16, mounted onto the housing 100 of the base unit 1, is electrically connected to the activation module 15. It preferably consists of an orientable accelero-contact sensor rigidly fixed to the protective housing 100 of the base unit 1. In this way, this orientable accelero-contact sensor is subjected to the various accelerations transmitted to the structure of the aircraft. A water pressure sensor, together with an electro-acoustic transducer, may be connected to this activation module allowing a signal to be transmitted that is detectable under water.

The electrical power supply module 14 of the base unit 1 is designed to supply the power required by the base unit 1 and to potentially manage the recharging of the source of electrical power equipping the beacon 2. The recharging of this power source is carried out using the electrical power provided by the electrical power supply of the aircraft. The electrical power supply module 14 could also manage the recharging of a source of electrical power that the base unit 1 may comprise.

The activation module 15 of the base unit 1 is designed to activate the beacon 2 in order for the latter to transmit a distress signal in the case of an abnormal situation which will be received by a constellation of satellites and subsequently transmitted to ground stations. A distress signal may also be generated and transmitted to the ground, or stored in the memory module 22 in order to be used later. The activation can be triggered when an impact is detected, or by a manual command remotely controlled by the pilot or by another known system that determines the situation requires it.

The beacon 2 comprises a power block 30 and a control and processing unit 21 arranged around a microcontroller. The interface and protection module 20 for the beacon 2 is connected to this control and processing unit 21. Also connected to this control and processing unit 21 are a memory module 22, an RFID identification module 23, a global positioning module 24 designed to indicate the geographical coordinates of the aircraft or of the beacon, a man-machine interface 25, and a radio transmission module 26.

The memory module 22 is for example of the non-volatile type. In this memory module 22 are stored the values relating to the various useful parameters of the flight, notably to the analysis and to the understanding of damage and accidents. In this memory module 22, the geographical position of the aircraft is also stored at regular time intervals or continuously. These data values, received from the bus 121 of the aircraft by the electronic management unit 10 that the base unit 1 comprises, are transmitted to the removable beacon 2 and, more particularly, to the control and processing unit 21 via the interface and protection modules 12 and 20. Subsequently, these data values are stored in the memory module 22. The memory module 22 periodically saves and archives the data in order to compile a time history of the latter.

The RFID identification module 23 allows the information contained in RFID chips 17 and 27 to be read. The RFID chip 17 is integrated into the base unit 1 and contains an identification code specific to the base unit 1. The RFID chip 27 is integrated into the beacon 2 and contains an identification code for the beacon 2. The chips RFID 17 and 27 are re-writable during a maintenance operation.

When the beacon 2 is connected to the base unit 1, the RFID identification module 23 reads the information contained in the RFID chip 17 of the base unit 1. When the beacon 2 and the base unit 1 are separated, the RFID identification module 23 reads the information contained in the RFID chip 27 that the beacon 2 comprises.

When the beacon 2 is installed on the base unit, the data relating to the geographical coordinates of the aircraft are read from the data bus 121 of the aircraft and the global positioning module 24 is disabled by the control and processing unit 21. The separation of the beacon 2 from the base unit 1 leads to the re-activation of the global positioning module 24 by the control and processing unit 21.

The global positioning module 24 may be of any known type. It is connected to an antenna 24a internal to the beacon 2 (antenna of the type GNSS, acronym for Global Navigation Satellite System). This module 24 is designed to determine, using the signals that it receives from a suitable constellation of satellites, the geographical coordinates of the aircraft or of the beacon. These coordinates are periodically stored by the control and processing unit 21 in the memory module 22.

The man-machine interface 25 is composed of a display and of a keyboard comprising several keys. The display allows, amongst other things, the display of the localization information and of the acknowledgment of the alert by the satellite system and the ground. This return of information is carried out via the global positioning module 24, the display of the identification allowing the identifier code of the beacon 2 to be verified without specific tools.

The radio transmission module 26 transmits the distress signals over the frequencies allocated to COSPAS-SARSAT, these signals being able to contain notably the geographical coordinates of the aircraft and potentially the identification codes of the base unit and/or of the beacon, respectively written into the RFID chips 17 and 27. This transmission module 26 is associated by electrical connection with the UHF and VHF antenna 26d of the beacon 2. It is also connected by means of the base unit 1 to the external UHF and VHF antenna 122 of the aircraft when the beacon 2 is installed in said base unit 1.

The radio transmission module 26 comprises VHF and UHF transmission modules 26a, 26b, placed under the control of a module of control and management 26c of the VHF/UHF antennas 26d of the beacon 2 and 122 of the aircraft.

The power block 30 of the beacon 2 is an electrical power supply block which comprises one or more electrical batteries 30a and an electronic memory board 30b which records the power consumption demands from the batteries. The batteries 30a may be of the non-rechargeable, or alternatively, rechargeable type.

The beacon 2 is equipped with a light indicator, such as a flasher, together with retro-reflector areas.

The beacon 2 is advantageously equipped with a water detector, know per se, electrically connected to the control and processing unit (21) in order to ensure an automatic triggering of a distress signal in the presence of water whether it is installed on the base unit 1 or separated from this base unit.

FIG. 2a shows a distress beacon 2 of the survival beacon type, whereas FIG. 2b shows an automatic distress beacon system comprising the beacon 2 and its base unit 1, such as previously described. As can be seen in FIGS. 2a and 2b, the beacon 2 is identical in both cases.

A first beacon 2, referred to as a survival beacon, will be placed in the main cabin of the aircraft, either fixed to a passive support whose only function is to hold it in place so as to avoid from hitting the structure or a neighboring object, or slipped into a protective cover and stored in a luggage hold. It is inactive as long as no one has activated it, according to the procedures applicable in the case of an accident, or until the presence of water is detected.

A second beacon 2, referred to as an automatic beacon, will only on the other hand be fixed (in a removable manner) onto a base unit 1, itself being fixed (in a permanent manner) to the structure of the aircraft. The RFID identification chips 17 and 27 of the base unit 1 and of the beacon 2 are then located near to one another, such that the RFID identification module 23 reads the content of the RFID chip 17, in other words the identification code of the base unit 1, as a first priority. The respective interface and protection modules 12 and 20 of the base unit 1 and of the beacon 2 are connected and transfer across the data necessary for the operation of the system.

Once removed from the base unit 1, the beacon 2 acts as an emergency survival beacon and is able to be activated manually in order to trigger a distress signal designed to be received by a constellation of satellites, this distress signal notably containing the data relating to the geographical coordinates of the beacon and the identification code of the beacon. For this purpose, the beacon comprises means for manually triggering the distress signal, these means consisting of a dedicated key of the keyboard of the man-machine interface 25, of this man-machine interface 25, and of the control and processing unit 21. Whenever it detects the dedicated key being pushed for the triggering of the distress signal, the control and processing unit 21 activates the radio transmission module 26 with a view to transmitting a distress signal and reads in the memory module 22 the data relating to the geographical coordinates of the beacon and, by means of the RFID identification module 23, reads the identification code of the beacon contained in the RFID chip 27. This information is transmitted by the distress signal to the constellation of satellites.

Lastly, it should be noted that the field of application of the subject of the present invention is not only limited to aircraft. On the contrary, without straying from the scope of the present invention, the subject of the present invention can equip any type of airborne, terrestrial or maritime vehicle.

It goes without saying that the present invention may undergo any development and receive any variant from the field by technical equivalents without however straying from the scope of the present patent such as defined by the claims hereinafter.

The invention claimed is:

1. An automatic distress beacon system configured to equip a vehicle, comprising:
   a fixed base unit configured to be rigidly fixed to a structure of the vehicle, and comprising an electronic management unit; and
   a removable beacon configured to be releasably mounted on the base unit to transform from a survival beacon to the automatic distress beacon and configured to be removed from the base unit to transform the automatic distress beacon to the survival beacon,
   the electronic management unit comprises a first connector to connect to a data and control bus of the vehicle to receive data from the data and control bus and commands to activate the beacon; and a second connector to connect to the beacon to transmit data and activation commands to the beacon,
   the beacon comprises at least one memory module to store the transmitted data and a radio transmission module connected via the base unit to an external transmission antenna of the vehicle.

2. The automatic distress beacon system as claimed in claim 1, wherein the vehicle is an aircraft or a ship.

3. The automatic distress beacon system as claimed in claim 1, wherein that the base unit comprises at least one detector to detect abnormal events connected to the electronic management unit and activate the beacon in response to detecting an abnormal event.

4. The automatic distress beacon system as claimed in claim 1, wherein the electronic management unit further comprises an activation module of the beacon; a data communications module providing an interface with the data and control bus; and an electrical power supply module.

5. The automatic distress beacon system as claimed in claim 3, wherein said at least one detector the comprises an impact detector connected to an activation module of the beacon.

6. The automatic distress beacon system as claimed in claim 5, wherein the impact detector is an orientable accelero-contact sensor.

7. The automatic distress beacon system as claimed in claim 1, wherein the base unit comprises an electro-acoustic transducer connected to an activation module of the beacon.

8. The automatic distress beacon system as claimed in claim 1, wherein a power source of the vehicle supplies an electrical power to the base unit.

9. The automatic distress beacon system as claimed in claim 1, wherein the base unit further comprises an electrical power source.

10. The automatic distress beacon system as claimed in claim 1, wherein the beacon further comprises a trigger to manually trigger a distress signal.

11. The automatic distress beacon system as claimed in claim 1, wherein the beacon further comprises a control and processing unit electrically connected to said at least one memory module.

12. The automatic distress beacon system as claimed in claim 1, wherein the beacon further comprises a unique beacon identifier; and wherein the base unit further comprises a unique base identifier.

13. The automatic distress beacon system as claimed in claim 1, wherein the beacon further comprises a control and processing unit electrically connected to said at least one memory module; wherein the beacon further comprises an identification module configured to read the unique beacon identifier, and configured to read the unique base identifier of the base unit to which the beacon is installed; and wherein the identification module is electrically connected to the control and processing unit.

14. The automatic distress beacon system as claimed in claim 10, wherein the beacon further comprises a control and processing unit electrically connected to said at least one memory module and a global positioning module, connected to the control and processing unit, configured to provide geographical coordinates of the vehicle or the beacon.

15. The automatic distress beacon system as claimed in claim 10, wherein the beacon further comprises a control and processing unit electrically connected to said at least one memory module, and a man-machine interface, connected to the control and processing unit, comprising a display screen and a keyboard.

16. The automatic distress beacon system as claimed in claim 15, wherein the beacon further comprises an unique beacon identifier, an identification module configured to read the unique beacon identifier, and a global positioning module, connected to the control and processing unit, configured to provide geographical coordinates of the vehicle or the beacon; wherein the trigger is formed by a dedicated key on the keyboard of the man-machine interface; wherein, in response to detecting the dedicated key being pressed, the control and processing unit activates the radio transmission module to transmit the distress signal, reads data relating to the geographical coordinates of the beacon in said at least one memory module, and reads the unique beacon identifier of the beacon utilizing the identification module so that the transmitted distress signal contains the geographical coordinates of the beacon and the unique beacon identifier of the beacon.

17. The automatic distress beacon system as claimed in claim 11, wherein the beacon further comprises a water detector electrically connected to the control and processing unit.

18. The automatic distress beacon system as claimed in claim 10, wherein the beacon further comprises a power block comprising one or more electrical batteries and an electronic unit to cumulate energy consumed.

19. The automatic distress beacon system as claimed in claim 1, wherein the base unit further comprises a pressure detector electrically connected to the electronic management unit and an electro-acoustic transducer activated by the electronic management unit in response to detecting an abnormal pressure.

* * * * *